Figure 1:
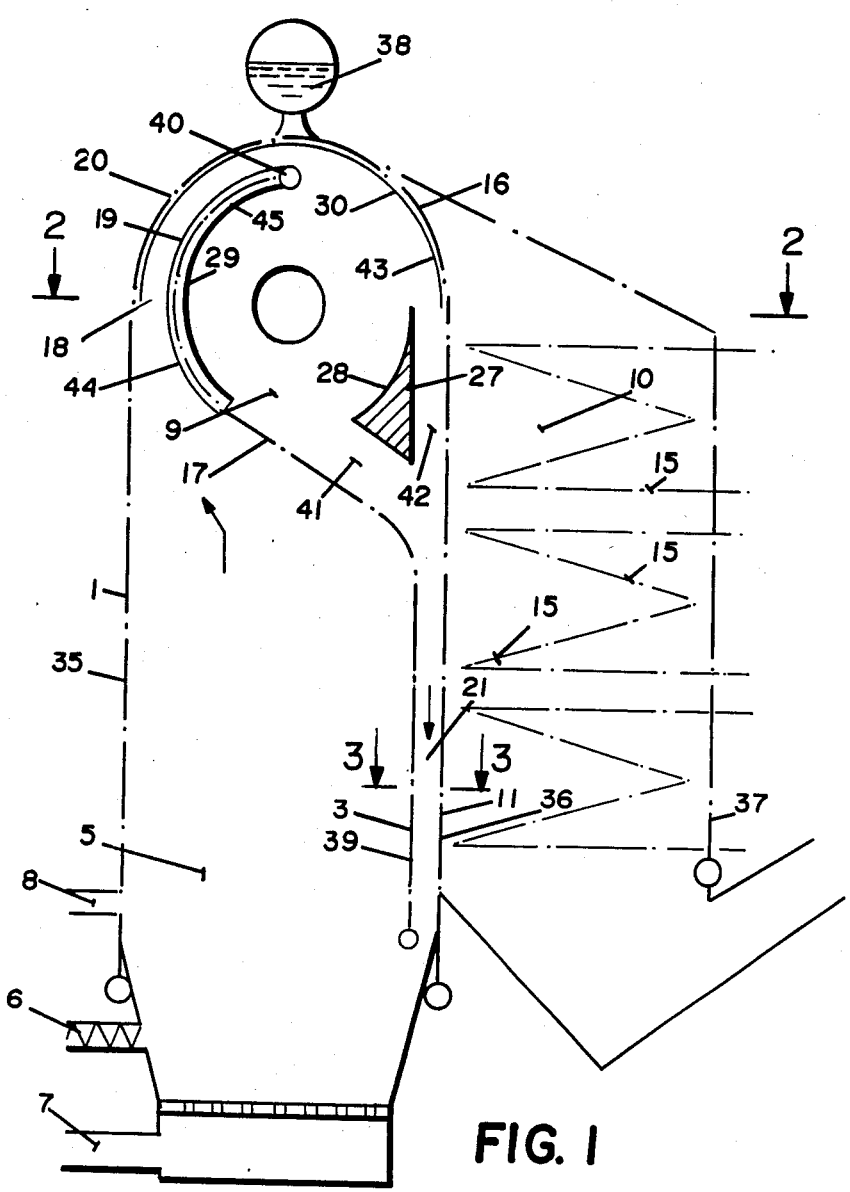

United States Patent [19]

Engström

[11] Patent Number: 4,708,092
[45] Date of Patent: Nov. 24, 1987

[54] CIRCULATING FLUIDIZED BED BOILER

[75] Inventor: Folke Engström, San Diego, Calif.

[73] Assignee: A. Ahlstrom Corporation, Karhula, Finland

[21] Appl. No.: 915,065

[22] PCT Filed: Jan. 23, 1986

[86] PCT No.: PCT/FI86/00007
§ 371 Date: Sep. 22, 1986
§ 102(e) Date: Sep. 22, 1986

[87] PCT Pub. No.: WO86/04402
PCT Pub. Date: Jul. 31, 1986

Related U.S. Application Data

[63] Continuation-in-part of Ser. No. 734,716, May 16, 1985, Pat. No. 4,672,918.

[30] Foreign Application Priority Data

Jan. 29, 1985 [FI] Finland .................... 850372

[51] Int. Cl.⁴ .............................................. F22B 1/00
[52] U.S. Cl. .................................. 122/4 D; 110/216; 110/245
[58] Field of Search ............... 122/4 D; 110/245, 216; 431/7, 170

[56] References Cited

U.S. PATENT DOCUMENTS 4,165,717 8/1979 Reh et al. .................... 431/7 X

FOREIGN PATENT DOCUMENTS

| 0060044 | 9/1982 | European Pat. Off. . |
| 8504117 | 3/1985 | PCT Int'l Appl. . |
| 8201589-2 | 9/1983 | Sweden . |
| 2046886 | 11/1980 | United Kingdom . |
| 2079620 | 1/1982 | United Kingdom . |
| 2104408 | 3/1983 | United Kingdom . |
| 879144 | 11/1981 | U.S.S.R. . |

Primary Examiner—Edward G. Favors
Attorney, Agent, or Firm—Nixon & Vanderhye

[57] ABSTRACT

The invention comprises a circulating fluidized bed boiler having a vertical combustion chamber and a convection part which at least partly are formed by tube walls, and a horizontal cyclone separator, the gas inlet channel of which is connected to the upper part of the combustion chamber and a return channel for solids to the lower part of the combustion chamber. In order to accomplish a compact construction, the cyclone separator has been located on top of the combustion chamber and two opposite tube walls of the combustion chamber and possibly also one tube wall of the convection part have been used to form the cyclone separator.

7 Claims, 5 Drawing Figures

CIRCULATING FLUIDIZED BED BOILER

This application is a continuation-in-part of application Ser. No. 734,716 filed May 16, 1985, U.S. Pat. No. 4,672,918.

The present invention relates to a circulating fluidized bed boiler having a vertical combustion chamber and a convection part which at least partly are formed by tube walls, and a horizontal cyclone separator, the gas inlet channel of which is connected to the upper part of the combustion chamber and a return channel for solids to the lower part of the combustion chamber.

The object of the invention is to accomplish a constructionally simple and compact circulating fluidized bed boiler in which solids can effectively be separated from the flue gases and returned to the combustion chamber of the boiler.

The circulating fluidized bed technique has long been applied e.g. in calcinators and is nowadays applied to a growing extent in various reactors, such as boilers and gasifiers. In known applications, the separation of solids from flue gases takes place in an ordinary, in its lower part funnel-shaped cyclone separator, in the cylindrical turbulence chamber of which is disposed a gas outlet pipe that leads the gases upwards, and from which solids are returned to the reactor via a discharge pipe.

As an example can be mentioned a circulating fluidized bed boiler known from the Swedish publication No. 8203268-1 in which the back wall of the combustion chamber has been bended towards the front wall to form the ceiling of the combustion chamber. Directly under the ceiling is located a discharge opening for flue gases which is connected to the cyclone separator. The gas outlet opening of the cyclone separator is connected to a channel on top of the ceiling which channel has a connection to the vertical convection part, one wall of which is formed by the back wall of the combustion chamber. Because the cyclone separator is separated from the boiler and located on different side of the boiler than the convection part, the gas channel system becomes complicated and requires several expansion joints. In the circulating fluidized bed boiler according to the invention the horizontal cyclone separator has been located on top of the boiler and connected to it in a way that avoids the above mentioned problems.

The solution according to the invention is mainly characterized in that two opposite tube walls of the combustion chamber have been used to form the cyclone separator.

Because the separator has been integrated with the construction of the circulating fluidized bed boiler a both space and material saving construction is accomplished.

Figure 2:
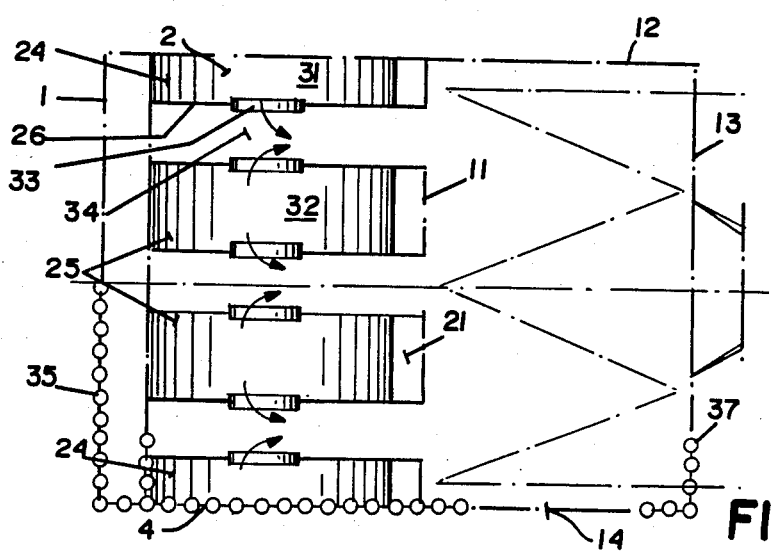
Figure 3:
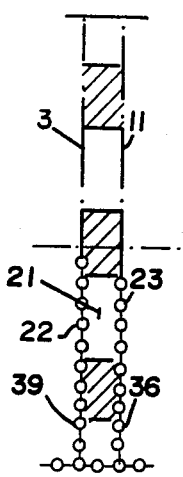
Figure 4:
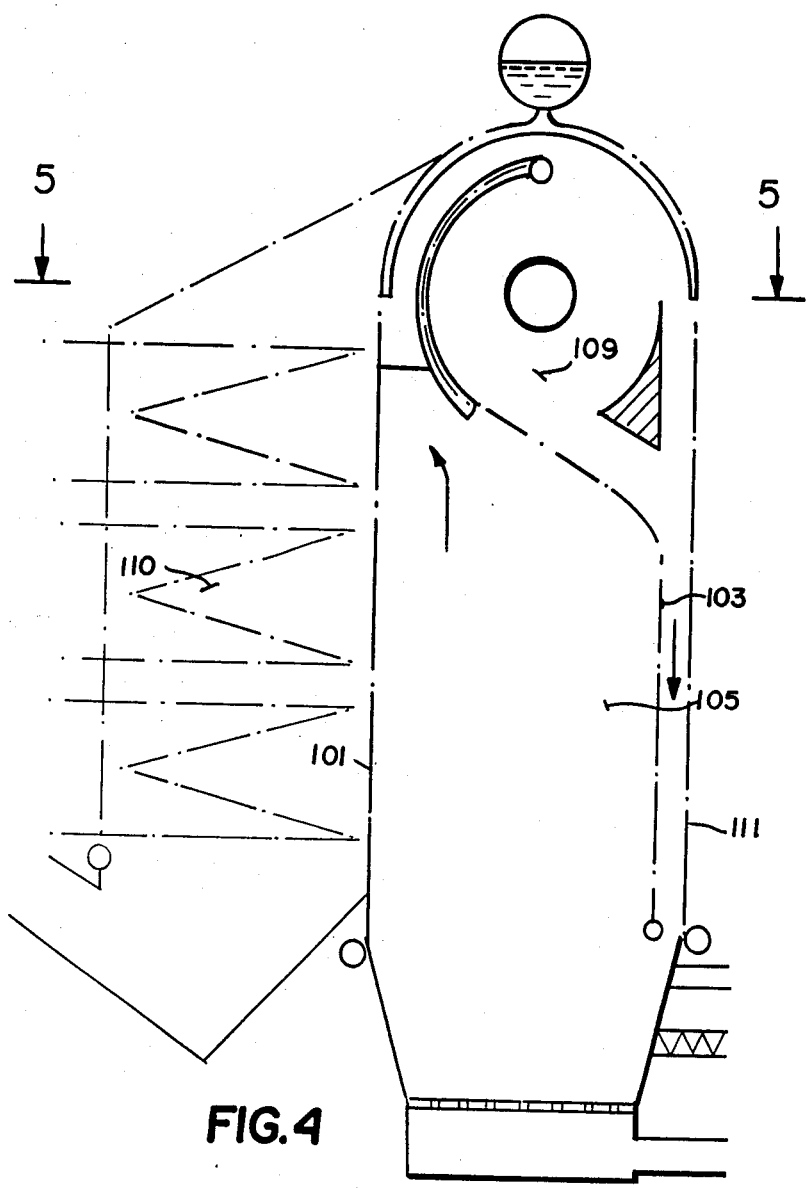

The invention will be described in detail in the following with reference to the accompanying drawings in which FIG. 1 shows a vertical section of one embodiment of the invention, FIG. 2 shows a section along the line A—A in FIG. 1, FIG. 3 shows a section along the line B—B in FIG. 1, FIG. 4 shows a vertical section of another embodiment of the invention and FIG. 5 a section along the line C—C in FIG. 4.

The steam boiler shown in the FIGS. 1-3 comprises a combustion chamber 5 defined by four walls 1-4 formed by tubes that have been welded together in a way known per se. The tubes form heat transfer surfaces of the boiler and they have been connected to the boiler circulation system in a way that has not been described in detail.

A fuel inlet channel 6 is located in the lower part of the combustion chamber. There are also inlet channels 7 and 8 for primary gas and secondary gas respectively.

A horizontal cyclone separator 9 is disposed on top of the combustion chamber. Beside the combustion chamber is situated a vertical convection part 10 which is defined by tube walls 11-14 and in which heat transfer surfaces 15 additionally have been disposed.

Front and back walls 1, 3 of the combustion chamber and of wall 11 of the convection part parallel with the back wall 3 of the combustion chamber have been used to form the cyclone separator. The front wall 1 of the combustion chamber and the wall 11 of the convection part have been bended towards each other and connected with each other to form a cylindrical upper part 16 of the separator. The back wall 3 of the combustion chamber has been bended towards the front wall to form a ceiling 17 of the combustion chamber and runs then parallelly with the cylindrical part of the front wall so that they form together an inner and outer wall 19, 20 of the gas inlet channel 18 of the separator.

Using the back wall 3 of the combustion chamber and the wall 11 of the convection part two opposite walls 22, 23 of return channels 21 have been formed that connect the separator to the lower part of the combustion chamber.

A partition wall 26 divides the separator into parallelly functioning units 24 and 25. Each unit has been provided with a guide 27 the inner surface 28 of which forms with the inner surfaces 29 and 30 of the cylindrical upper part of the back wall 3 of the combustion chamber and the wall 11 of the convection part parallel turbulence chambers 31 and 32. The partition walls 26 with openings 33 form end walls of the turbulence chambers and side walls of the return channels. Each turbulence chamber has been connected to its own return channel. Passages 34 between the turbulence chambers open into the convection part.

Tubes 35 of the front wall of the combustion chamber, tubes 36 of the wall 11 of the convection part and tubes 37 of the opposite wall 13 have been connected to a collector tube 38 and tubes 39 of the back wall of the combustion chamber have been connected to a collector tube 40.

When leaving the combustion chamber the flue gases containing solids are lead to the turbulence chambers 31, 32 of the parallel separation units through a gas inlet channel 18 that is tangentially connected to the turbulence chamber.

The solids concentrated on the outer periphery of the turbulence chambers are discharged from the turbulence chamber through openings 41 and 42 formed between the guide 27 and the walls 3 and 11 and returned to the combustion chamber through the return channels 21. The purified gases flow through the openings 33 in the end walls of the turbulence chambers and through channels 34 formed between these to the convection part 10.

In order to prevent erosion the tube walls forming the separator are lined with a fire and erosion resistant coating 43, 44 and 45 e.g. mortar.

In the steam boiler shown in the FIGS. 1-3, the return channels 21 for solids of the separator are located between the combustion chamber and the convection part.

Figure 5:
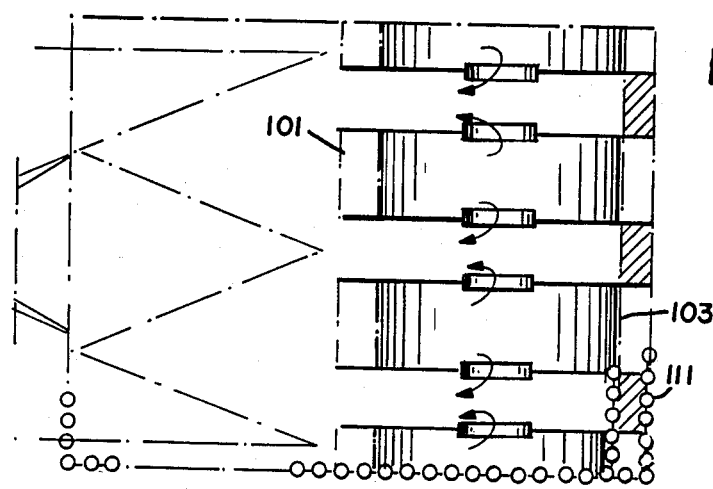

In the steam boiler shown in the FIGS. 4 and 5, the return channels for solids of the separator and the convection part have been located on different sides of the combustion chamber. The opposite tube walls 101 and 103 of the combustion chamber 105 and the wall 111 parallel with the wall 103 have been used to form the cyclone separator 109. One wall 101 of the combustion chamber forms one of the tube walls of the convection part 110. The back wall 103 of the combustion chamber and beside the combustion chamber with this wall parallel tube wall 111 have been used to form return channels for solids of the separator.

The invention is not limited to the above embodiments but it can be modified and applied within the inventive concept defined by the claims.

I claim:

1. In a circulating fluidized bed boiler having a vertical combustion chamber and a convection part which at least partly are formed by tube walls, and a horizontal cyclone separator, the gas inlet channel of which is connected to the upper part of the combustion chamber and a return channel for solids to the lower part of the combustion chamber, the improvement comprising two opposite tube walls of the combustion chamber being used to form the cyclone separator.

2. The circulating fluidized bed boiler according to claim 1, wherein two opposite tube walls of the combustion chamber and a wall parallel with one the tube walls beside the combustion chamber are used to form the cyclone separator.

3. The circulating fluidized bed boiler according to claim 2, the two opposite tube walls of the combustion chamber and one of the tube walls of the convection part are used to form the cyclone separator.

4. The circulating fluidized bed boiler according to claim 1, 2 or 3, wherein two opposite tube walls of the combustion chamber are used to form a gas inlet channel tangentially connected to the cyclone separator.

5. The circulating fluidized bed boiler according to claim 3, wherein one of the opposite tube walls of the combustion chamber and one of the tube walls of the convection part are used to form a turbulence chamber of the cyclone separator.

6. The circulating fluidized bed boiler according to claim 2, wherein two opposite tube walls of the combustion chamber are used to form a gas inlet channel tangentially connected to the cyclone separator.

7. The circulating fluidized bed boiler according to claim 3, wherein two opposite tube walls of the combustion chamber are used to form a gas inlet channel tangentially connected to the cyclone separator.

* * * * *